US008189155B2

(12) United States Patent
Chan et al.

(10) Patent No.: US 8,189,155 B2
(45) Date of Patent: May 29, 2012

(54) ARRAY PANEL

(75) Inventors: Te-Wei Chan, Hsinchu (TW); Yi-Pai Huang, Hsinchu (TW); Chung-Yi Chiu, Hsinchu (TW); Yen-Ting Chen, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 12/408,961

(22) Filed: Mar. 23, 2009

(65) Prior Publication Data

US 2009/0180065 A1 Jul. 16, 2009

Related U.S. Application Data

(63) Continuation of application No. 11/671,049, filed on Feb. 5, 2007, now Pat. No. 7,697,093.

(30) Foreign Application Priority Data

Aug. 8, 2006 (TW) ............................... 95129118 A
Oct. 17, 2006 (TW) ............................... 95138272 A

(51) Int. Cl.
*G02F 1/1337* (2006.01)
(52) U.S. Cl. ........................................ 349/130; 349/129
(58) Field of Classification Search .................... None
See application file for complete search history.

(56) References Cited

U.S. PATENT DOCUMENTS

| | | | |
|---|---|---|---|
| 6,490,020 B2 * | 12/2002 | Kung ........................... 349/117 |
| 6,552,770 B2 * | 4/2003 | Yanagawa et al. ........... 349/155 |
| 7,023,516 B2 | 4/2006 | Yoshida et al. |
| 7,034,789 B2 | 4/2006 | Takeuchi et al. |
| 7,095,471 B2 | 8/2006 | Wu |
| 7,193,675 B2 | 3/2007 | Hiroshi |
| 7,317,503 B2 | 1/2008 | Lee et al. |
| 7,460,201 B2 * | 12/2008 | Ashizawa et al. ............. 349/141 |
| 7,518,684 B2 * | 4/2009 | Huang et al. .................. 349/129 |
| 7,522,245 B2 * | 4/2009 | Kim et al. ..................... 349/141 |

(Continued)

FOREIGN PATENT DOCUMENTS

| | | |
|---|---|---|
| CN | 1959507 B | 7/2010 |
| TW | 225570 | 12/2004 |

OTHER PUBLICATIONS

Chan, et al., Non-Final Office Action mailed Oct. 6, 2008, filed Feb. 5, 2007, U.S. Appl. No. 11/671,049.

(Continued)

*Primary Examiner* — Thanh-Nhan P. Nguyen
(74) *Attorney, Agent, or Firm* — Thomas, Kayden, Horstemeyer & Risley, LLP

(57) ABSTRACT

An array panel is provided. The array panel includes a substrate, a common electrode, and pixel structures. Each pixel structure includes a first pixel electrode, a second pixel electrode, and a shield. The first pixel electrode has a central portion, first branches that connect to the central portion, and a connecting portion. The shield overlaps with at least the central portion of the first pixel electrode. The connecting portion connects the ends of at least two of the first branches. The central portion connects perpendicularly with one of the first branches; this branch overlaps with at least part of the common electrode so that the width of this branch is greater than or equal to that of the common electrode. The second pixel electrode, adjacent to the first pixel electrode, comprises a central portion and second branches that connect to the central portion.

7 Claims, 10 Drawing Sheets

U.S. PATENT DOCUMENTS

| | | | |
|---|---|---|---|
| 2001/0040647 A1* | 11/2001 | Song et al. | 349/43 |
| 2003/0137628 A1* | 7/2003 | Nagaoka | 349/141 |
| 2005/0078255 A1 | 4/2005 | Hiroshi | |
| 2005/0099582 A1 | 5/2005 | Doi et al. | |
| 2005/0128396 A1 | 6/2005 | Tsuchiya et al. | |
| 2006/0125989 A1* | 6/2006 | Park et al. | 349/141 |
| 2008/0100767 A1* | 5/2008 | Chan et al. | 349/54 |
| 2009/0052174 A1 | 2/2009 | Tsai et al. | |

OTHER PUBLICATIONS

China Office Action mailed Jan. 31, 2011.
English translation of pertinent parts of China Office Action dated Jan. 31, 2011.
Taiwan Office Action mailed Feb. 24, 2011.
English translation of pertinent parts of Taiwan Office Action dated Feb. 24, 2011.

* cited by examiner

ARRAY PANEL

The present application is a continuation application of U.S. patent application Ser. No. 11/671,049 filed on Feb. 5, 2007, now U.S. Pat. No. 7,697,093, which claimed the benefit from the priority of Taiwan Patent Applications No. 095138272 filed on Oct. 17, 2006 and 095129118 filed on Aug. 8, 2006, in which the disclosure of the latter is incorporated by reference herein in its entirety.

BACKGROUND OF THE INVENTION

1. Field of the Invention

The present invention relates to an array panel, specifically, to an array panel of a liquid crystal display that a color washout problem is reduced or avoided when under a wide viewing angle.

2. Descriptions of the Related Art

With fast developing technologies, people have become accustomed to using various electronic products. One key component of multimedia electronic products is the display. Because of its desirable characteristics, such as power-saving, radiation-free, small size, low power consumption, space-saving, flat square, high resolution, and stable display quality, thin film transistor liquid crystal displays (TFT LCDs) have gradually started to replace the traditional cathode ray tube (CRT) display. Consequently, TFT LCDs are widely used as the display panel of electronic products, such as cellular phones, display screens, digital TVs, and notebooks.

Since it has started to replace CRT displays, TFT LCDS have also improved quite rapidly, especially in improving display quality. For wide viewing angles, a multi-domain vertical alignment (MVA) technique, researched by Fujitsu, extends both the upper and lower viewing angle to about 120°. This technique improves the viewing angle for the LCD substantially so that the CRT display is not the only display that has the wide viewing angle characteristic.

However, the display that employs the multi-domain alignment technique has problems involving color washout under wide viewing angles and light leakage. These complications have led to alterations in the manufacturing process, resulting in higher costs. Consequently, a polymer stabilized alignment (PSA) technique has been developed to improve the drawbacks of the multi-domain vertical alignment technique. The pixel design of the PSA technique consists of a fixed pretilt angle in each liquid crystal cell. While the pixel structure is operating, the liquid crystal cell deflects to a required angle with a shorter response time according to an electric field formed between the pixel electrode and the common electrode. Thus, multiple sub-domains are formed according to the various shapes of the pixel electrodes.

Still, due to the irregular distribution of the electric field, the neighboring liquid crystal cells of the two pixel structures are not well arranged. The neighboring liquid crystal cells of the central area of the common electrode (common line) are also not well arranged as shown in the circled area of the pixel 1 in FIG. 1. These improperly arranged liquid crystal cells leads to color washout, such that a brightness area distribution is irregular, especially for representing left and right viewing angles. Consequently, although the PSA technique has enhanced the contrast ratio and brightness, while shortening the response time for TFT LCDs, the color washout problem under a wide viewing angle still has not been resolved.

In summary, current TFT LCDs problems with color washout under wide viewing angles. In addition, the brightness area distribution is not uniform due to the irregular arrangement of the liquid crystal cells which causes light leakage and affects display quality. Consequently, there is a need to find a method to prevent color washout under wide viewing angles from occurring, as well as a need to improve the arrangement of liquid crystal cells to prevent light leakage.

SUMMARY OF THE INVENTION

The primary objective of this invention is to provide an array panel. The array panel comprises a substrate and a plurality of pixel structures. The plurality of pixel structures is disposed on the substrate, wherein each of the pixel structures comprises a first pixel electrode and a first shield. The first pixel electrode comprises a central portion and a plurality of branches connecting with the central portion. The first shield overlaps the central portion of the first pixel electrode.

Another objective of this invention is to provide an array panel. The array panel comprises a substrate and a plurality of pixel structures. The plurality of pixel structures is disposed on the substrate, wherein each of the pixel structures comprises a first pixel electrode and a second pixel electrode. The first pixel electrode comprises a central portion, a plurality of branches, and a first connecting portion. The plurality of branches connects with the central portion. The first connecting portion connects the ends of at least two adjacent branches of the first pixel electrode, wherein the first connecting portion is substantially perpendicular to the central portion of the first pixel electrode. The second pixel electrode is adjacent to the first pixel electrode, and comprises a central portion and a plurality of branches. The plurality of branches connects to the central portion.

Yet another objective of this invention is to provide an array panel. The array panel comprises a substrate, a first common electrode, and a plurality of pixel structures. The first common electrode is disposed on the substrate, as well as the plurality of pixel structures. Each of the pixel structures comprises a first pixel electrode comprising a central portion and a first branch perpendicularly connected to the central portion. The first branch of the first pixel electrode overlaps at least part of the first common electrode. The width of the first branch of the first pixel electrode is wider than or equal to that of the first common electrode.

With the above arrangements, the invention can improve the color washout problem under wide viewing angles and further achieve an ideal arrangement for liquid crystal cells to prevent light leakage from occurring. As a result, there is a better display quality.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The invention applies a PSA technique to change the pixel structure of an array panel for improving the arrangement of liquid crystal cells. The present invention not only prevents light leakage but also solves the color washout problem under wide viewing angles. Detailed descriptions of the invention are shown below.

The invention reveals an array panel for a TFT LCD. The array panel comprises a substrate and a plurality of pixel structures disposed on the substrate.

Figure 1:
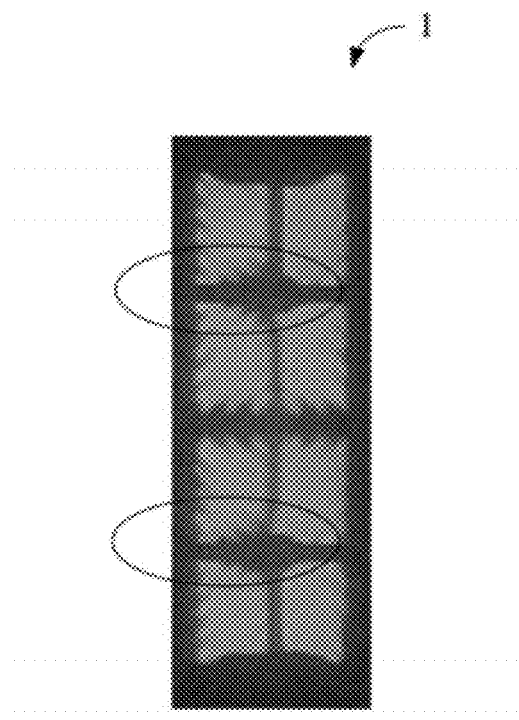
FIG. 1 is a diagram of a prior art pixel structure of an LCD.
Figure 2:
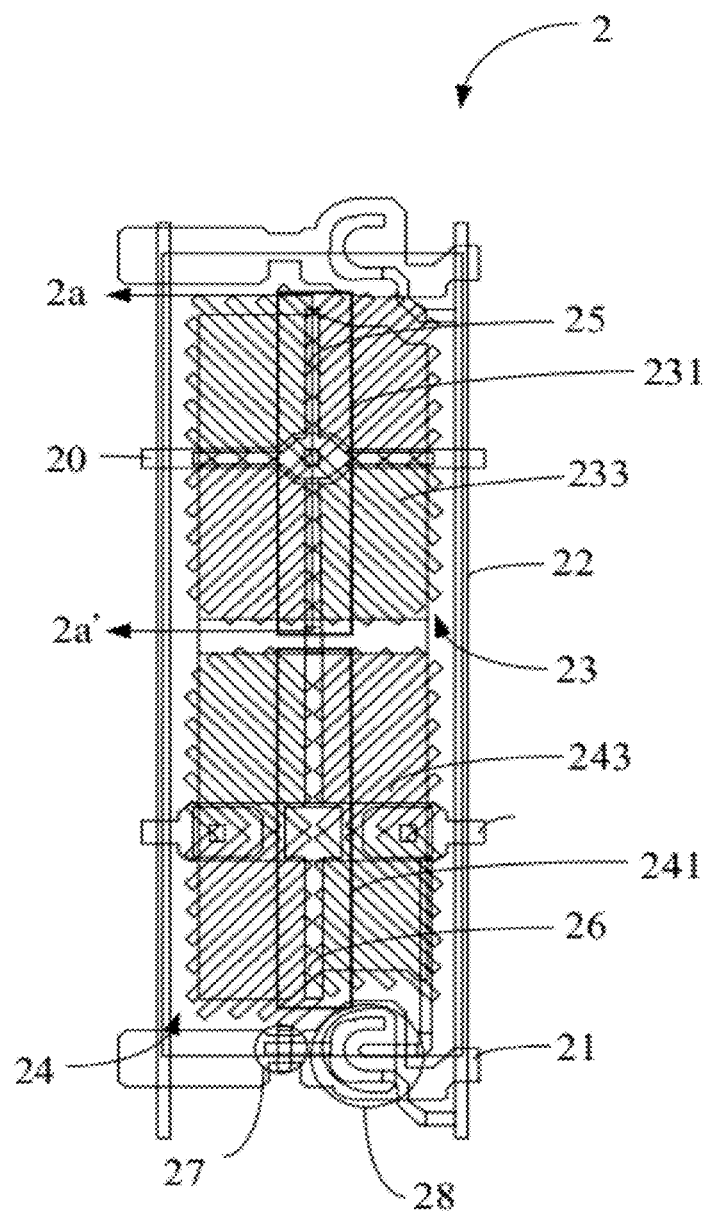
FIG. 2 is an upper view of a pixel structure of a first embodiment of the invention.
Figure 3:
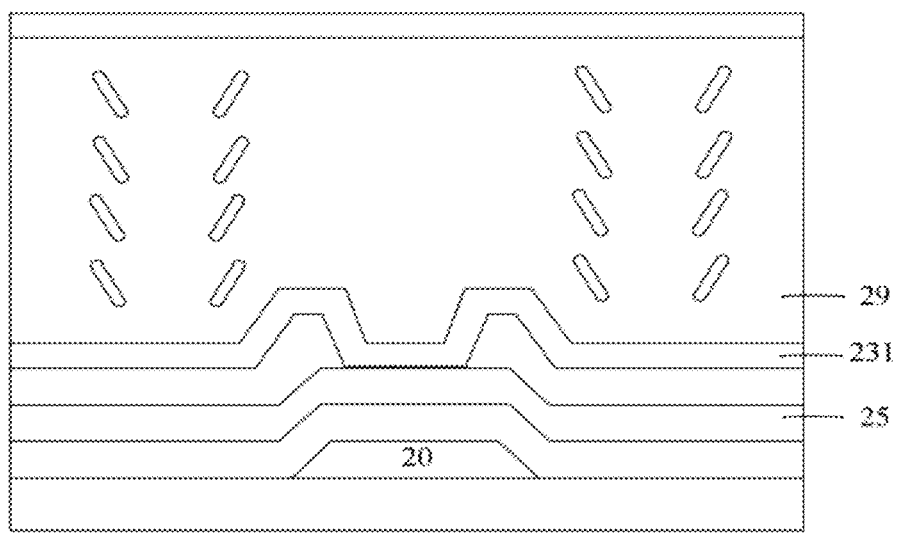
FIG. 3 is a cross-sectional view along the line 2a~2a' within the pixel structure in FIG. 2.

The first embodiment of the invention is shown in FIG. 2 and FIG. 3. In this embodiment, a pixel structure 2 comprises a common electrode 20, a scan line 21, a data line 22, a first pixel electrode 23, a second pixel electrode 24, a first shield, a second shield, a first switch and a second switch. The first shield is a first conducting wire 25, electrically connected to the first pixel electrode 23. The first conducting wire 25 connects with a second conducting wire 26, so that both are electrically connected with a first TFT 27. The first TFT 27 is used to control the first pixel electrode 23. The first conducting wire 25 and the second conducting wire 26 can be formed simultaneously. The first switch and the second switch are the first TFT 27 and a second TFT 28, respectively. The content disclosed in Taiwan Patent Application No. 95129118 is incorporated herein by reference.

FIG. 2 is an upper view of a pixel structure 2 of a first embodiment of the invention, while FIG. 3 is a cross-sectional view along the line 2a~2a' of the pixel structure 2. As shown in FIG. 2, the scan line 21 is used to transmit a scan signal, while the data line 22 is used for transmitting a voltage signal.

The first pixel electrode 23 comprises a first central portion 231 and a plurality of branches 233, wherein the plurality of branches 233 connects with the first central portion 231. Preferably, the plurality of branches 233 extends along the direction of an included angle, which can range from either 40°~50°, 130°~140°, 220°~230°, or 310°~320° with the first central portion 231. More preferably, the plurality of branches 233 extends along the direction of these four included angles of, 45°, 135°, 225°, and 315°. The portion of the plurality of branches 233 forms the same angle with the first central portion 231 and is parallel to the first central portion 231. Consequently, the first pixel electrode 23 can be divided into four sub-domains according to the branch directions. The first conducting wire 25 and the first shield, overlaps with the first central portion 231 and parts of the plurality of branches 233.

Similarly, the second pixel electrode 24 comprises a second central portion 241 and a plurality of branches 243. The plurality of branches 243 connects with the first central portion 241 and extends along four directions. The branches 243, forming the same included angles with the second central portion 241, are parallel to each other. Consequently, the second pixel electrode 24 can be divided into four sub-domains according to the branch directions. The second conducting wire 26 and the second shield, overlaps with the second central portion 241 and parts of the plurality of branches 243. In this embodiment, the first conducting wire 25 and the second conducting wire 26 can be made of a metal material.

Figure 4A:
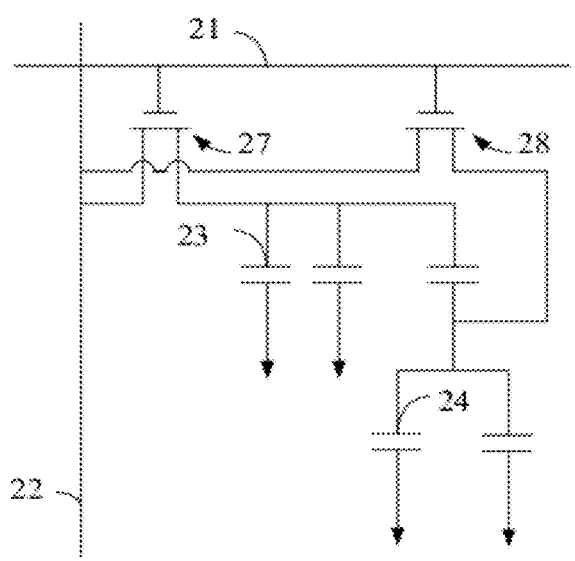
FIG. 4A is a coupling schematic TFTs of the first embodiment of the invention.

In the first embodiment, the first TFT 27 and the second TFT 28 are electrically coupled, wherein the first TFT 27 is a transistor with a weaker charging capability than the second TFT 28. The electrical coupling manner is shown in FIG. 4A. One end of a source/drain electrode of the first TFT 27 is electrically connected to the first pixel electrode 23 while the other end is connected to the data line 22. The gate electrode of the first TFT 27 is connected to the scan line 21. Consequently, the first TFT 27 is a switch of the pixel structure 2 which is activated in response to the scan signal. This switch conducts and transmits the voltage signal to the first pixel electrode 23 for driving the corresponding display area. One end of the source/drain electrode of the second TFT 28 is electrically connected to the second pixel electrode 24 while the end is connected to the data line 22. The gate electrode of the second TFT 28 is connected to the scan line 21. Consequently, the second TFT 28 is a switch of the pixel structure 2 which is activated in response to the scan signal. This switch conducts and transmits the voltage signal to the second pixel electrode 24 for driving the corresponding display area. The first TFT 27 can release electric charges accumulated in the first pixel electrode 23 through the data line 22 to prevent the formation of a remaining image of the first pixel electrode 23.

In the first embodiment, the first pixel electrode 23 and the second pixel electrode 24 of the pixel structure 2 are independent of each other. Consequently, voltage levels for both pixel electrodes may be different such that a liquid crystal layer 29 distributed in correspondence to both pixel electrodes show different liquid crystal arrangement because of different electric field strengths. Furthermore, each of the pixel electrodes has four sub-domains and hence, a pixel structure 2 comprises eight liquid crystal sub-domains. With an increased number of sub-domains, the color washout condition can be improved significantly. With the first conducting wire 25 or the second conducting wire 26 extending to the central portion of both pixel electrodes to shield the central portion in the invention, light leakage is also reduced and the brightness area is improved.

Figure 4B:
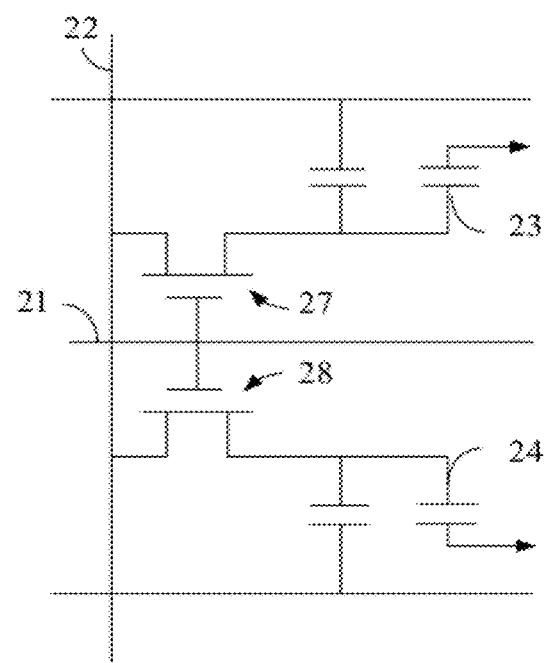
FIG. 4B is another coupling schematic TFTs of the invention.

The recited first embodiment is only used to illustrate one aspect of the present invention. In other aspects, a black matrix (BM) can also be used as the shield. While using the black matrix as the shield, the black matrix is disposed on the substrate. For example, the first shield and second shield can be the black matrix or a conducting wire. The black matrix or the conducting wire may overlap with the first or the second central portion, but not the plurality of branches. The shapes of the two pixel electrodes of the pixel structure 2 can be different, and each pixel structure is not limited to the comprising two pixel electrodes. The electrical coupling of the TFTs can also be done in the way shown in FIG. 4B.

Figure 5:
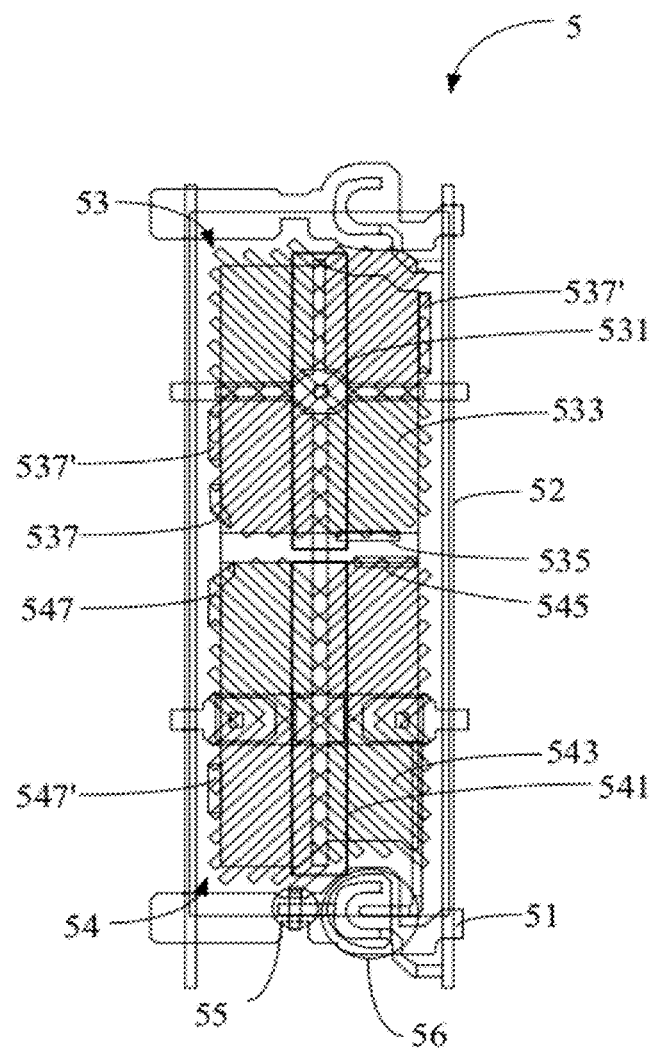
FIG. 5 is an upper view of a pixel structure of a second embodiment of the invention.

A second embodiment of the invention is shown in FIG. 5. In this embodiment, a pixel structure 5 comprises a scan line 51, a data line 52, a first pixel electrode 53, a second pixel electrode 54, a first switch, and a second switch, wherein the first switch and the second switch are the first TFT 55 and the second TFT, respectively. The scan line 51 is used to transmit a scan signal, while the data line 52 is used to transmit a voltage signal.

The first pixel electrode 53 comprises a first central portion 531, a plurality of branches 533, a first connecting portion 535, and first auxiliary connecting portions 537, 537'. The first connecting portion 535 and the first auxiliary connecting portion 537 may or may not connect together. The plurality of branches 533 connects with the first central portion 531. Preferably, the plurality of branches 533 extends along the direction of an included angle, which can range from either 40°~50°, 130°~140°, 220°~230°, or 310°~320° with the first central portion 531. More preferably, the plurality of branches 533 extends along the direction of these four included angles of, 45°, 135°, 225°, and 315°. The portion of the plurality of branches 533 forms the same angle with the first central portion 531 and is parallel to the first central portion 531. Consequently, the first pixel electrode 53 can be divided into four sub-domains according to the branch directions.

Figure 9:
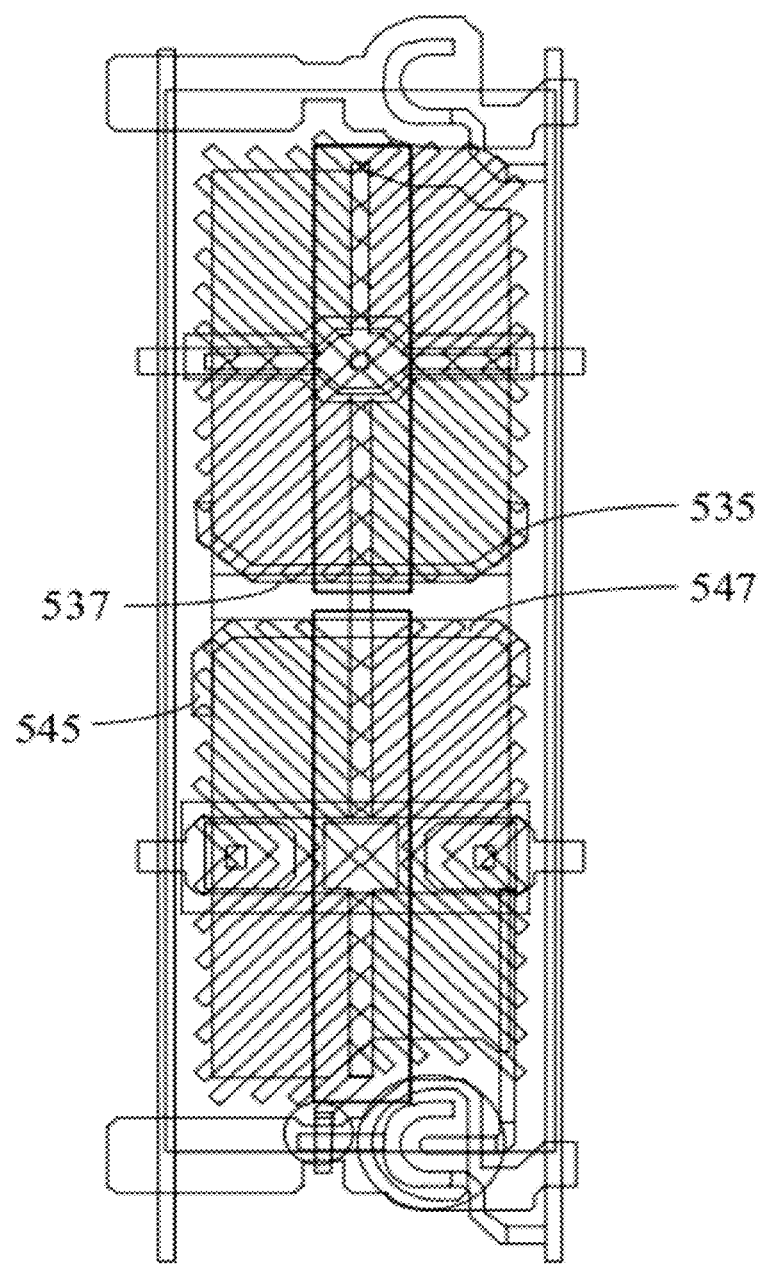
FIG. 9 is an upper view of a pixel structure of another modification of the second embodiment of the invention.

The first connecting portion 535 connects the ends of at least two adjacent branches of the first pixel electrode 53. The first connecting portion 535, which is perpendicular to the first central portion 531, may connect the ends of adjacent branches of the first pixel electrode 53. A number of the first connecting portion 535 can be plural, wherein the first connecting portion 535 is substantially perpendicular to the first central portion 531 of the first pixel electrode 53. The first auxiliary connecting portion 537 connects the ends of at least other two adjacent branches of the first pixel electrode 53, wherein the first auxiliary connecting portion 537 is substantially not perpendicular to the first central portion 531. In this embodiment, the first auxiliary connecting portion 537 is a polygon, one end of which is substantially parallel with the first central portion 531. The extension line of the other end substantially forms an acute angle with the first central portion 531. FIG. 5 shows the second embodiment with the second auxiliary connecting portion 547 and the second connecting portion 545 not connecting to each other. Refer to FIG. 9, it shows the modification of the second embodiment with the second auxiliary connecting portion 547 and the second connecting portion 545 connecting together. Furthermore, the first auxiliary connecting portion 537' can be disposed substantially parallel to the first central portion 531 to connect the ends of the adjacent branches. The number of the first auxiliary connecting portion 537' can be singular or plural as shown in FIG. 5.

Similarly, the second pixel electrode 54 comprises a second central portion 541, a plurality of branches 543, a second connecting portion 545, and second auxiliary connecting portions 547, 547'. The second connecting portion 545 and the second auxiliary connecting portion 547 may or may not connect together. The second pixel electrode 54 is adjacent to the first pixel electrode 53. The plurality of branches 543 connects with the second central portion 541. Preferably, the plurality of branches 533 extends along the direction of an included angle, which can range from either 40°~50°, 130°~140°, 220°~230°, or 310°~320° with the second central portion 541. More preferably, the plurality of branches 543 extends along the direction of these four included angles of, 45°, 135°, 225°, and 315°. The portion of the plurality of branches 543 forms the same angle with the first central portion 541 and is parallel to the second central portion 541. Consequently, the second pixel electrode 54 can be divided into four sub-domains according to the branch directions.

The second connecting portion 545 connects the ends of at least two adjacent branches of the second pixel electrode 54, and the number of the second connecting portion 545 can be plural. The second connecting portion 545 is substantially perpendicular to the second central portion 541 of the second pixel electrode 54. The second auxiliary connecting portion 547 connects the ends of at least two other adjacent branches of the second pixel electrode 54, wherein the second auxiliary connecting portion 547 is substantially not perpendicular to the second central portion 541. In this embodiment, the second auxiliary connecting portion 547 is a polygon, one end of which is substantially parallel to the second central portion 541. The extension line of the other end substantially forms an included angle with the second central portion 541. FIG. 5 shows the second embodiment with the second auxiliary connecting portion 547 and the second connecting portion 545 not connecting to each other. Refer to FIG. 9, it shows the modification of the second embodiment with the second auxiliary connecting portion 547 and the second connecting portion 545 connecting together. Furthermore, the second auxiliary connecting portion 547' can be disposed substantially parallel to the second central portion 541 to connect the ends of the adjacent branches. The number of the second auxiliary connecting portion 547' can be singular or plural.

Preferably, the adjacent branches connected by the first connecting portion 535 and the first auxiliary connecting portion 537 in the first pixel electrode 53 correspond to the adjacent branches connected by the second connecting portion 545 and the second auxiliary connecting portion 547 in the second pixel electrode 54.

The first TFT 55 electrically connects with the first pixel electrode 53, while the second TFT 56 electrically connects with the second pixel electrode 54. The first TFT 55 and the second TFT 56 are electrically coupled in the same manner as the first embodiment and is omitted here.

In the second embodiment, the first pixel electrode 53 and the second pixel electrode 54 of the pixel structure 5 are independent of each other. Consequently, voltage levels for both pixel electrodes may be different such that liquid crystal layers distributed in corresponding pixel electrodes show different liquid crystal arrangements with different electric field strengths. Furthermore, each of the two pixel electrodes has four sub-domains, and hence a pixel structure 5 comprises eight liquid crystal sub-domains. With an increased number of sub-domains, the color washout condition can be improved significantly.

In the second embodiment, the voltage level of both the first connecting portion 535 and the first auxiliary connecting portion 537 of the first pixel electrode 53, as well as the voltage level of the second connecting portion 545 and the second auxiliary connecting portion 546 of the second pixel electrode 54, are all adjusted to achieve a regular arrangement of liquid crystal cells between both pixel electrodes. This arrangement prevents insufficient color saturation and color washout under wide viewing angles.

The second embodiment is only used to illustrate one aspect of the invention. In other aspects, all the plurality of branches of the first pixel electrode can connect together via the first connecting portion and the first auxiliary connecting portion, while all the plurality of branches of the second pixel electrode can also connect together via the second connecting portion and the second auxiliary connecting portion. Both the first auxiliary connecting portion and the second auxiliary connecting portion can be strips that are parallel with the first and the second central portion. The first auxiliary connecting portion and the second auxiliary connecting portion can be strips which have corresponding extension lines that form an included angle with the first and the second central portion.

Furthermore, the invention reveals an array panel which is also used in a TFT LCD. The array panel comprises a substrate, a first common electrode, a second common electrode, and a plurality of pixel structures. The first common electrode and the second common electrode are disposed on the substrate. The plurality of pixel structures is also disposed on the substrate.

Figure 6:
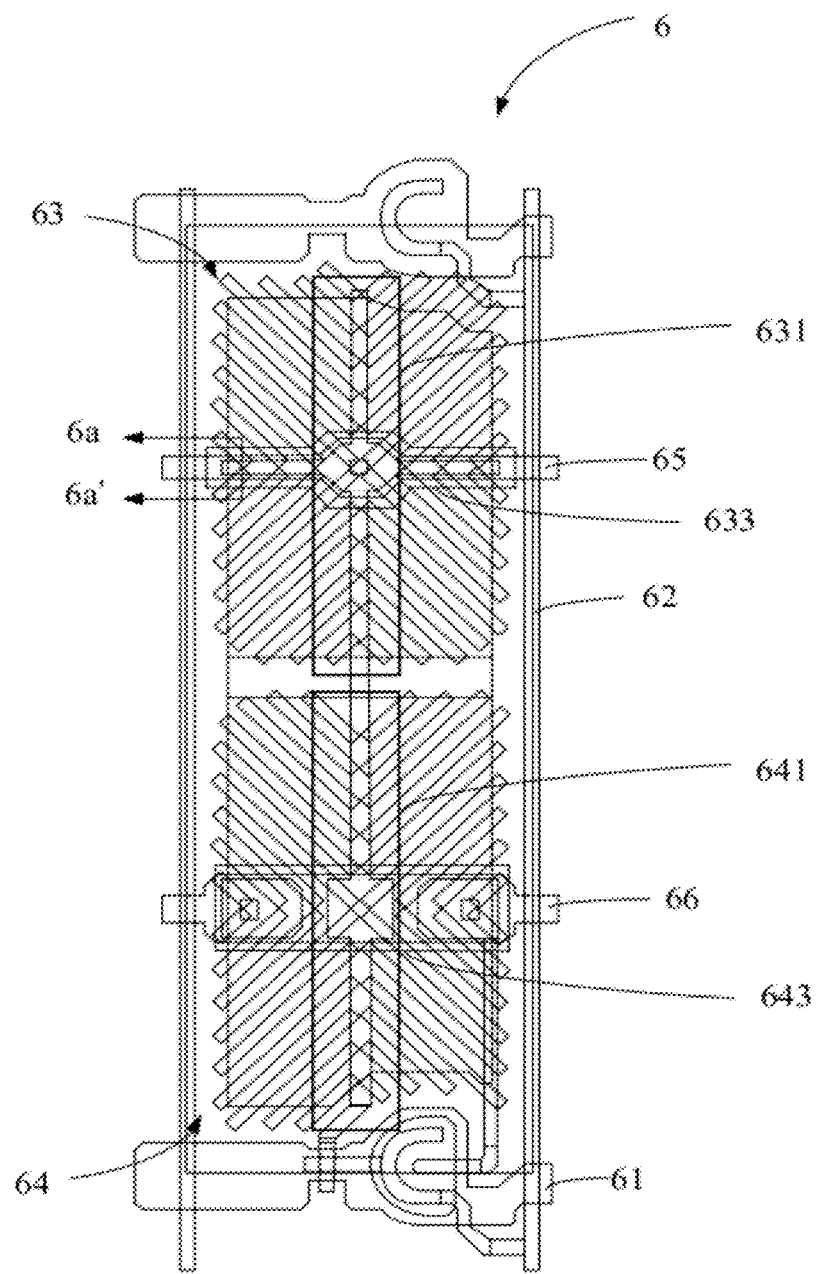
FIG. 6 is an upper view of a pixel structure of a third embodiment of the invention.
Figure 7:
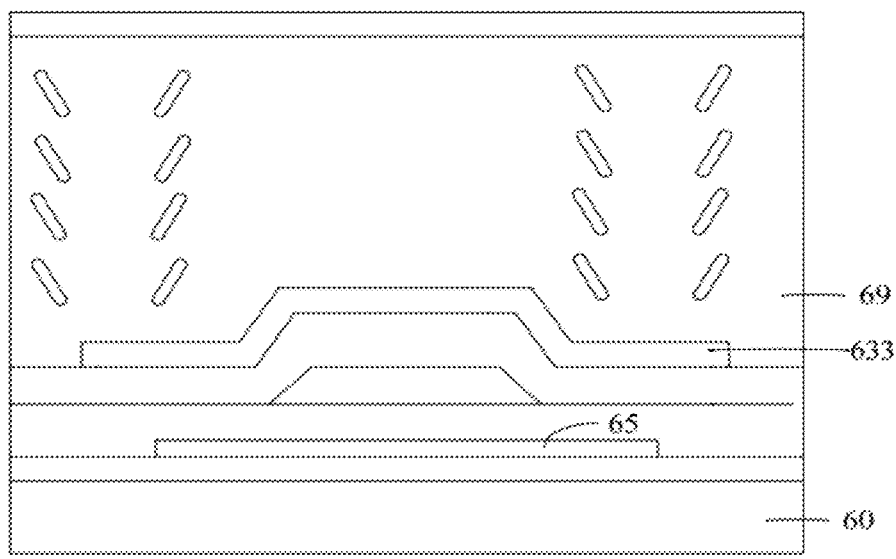
FIG. 7 is a cross-sectional view along the line 6a~6a' within the pixel structure in FIG. 6.

A third embodiment of the invention is shown in FIG. 6 and FIG. 7, wherein FIG. 6 is an upper view of a pixel structure 6 of the third embodiment of the invention and FIG. 7 is a cross-sectional view along the line 6a~6a' of the pixel structure 6. In this third embodiment, the pixel structure 6 comprises a scan line 61, a data line 62, a first pixel electrode 63, and a second pixel electrode 64. The first pixel electrode 63 comprises a first central position 631 and a first branch 633 that is perpendicularly connected to the first central portion 631. The first branch 633 of the first pixel electrode 63 overlaps with at least part of the first common electrode 65. The width of the first branch 633 of the first pixel electrode 63 extends about 0 to 4 μm out of one side of the first common electrode 65.

The second pixel electrode 64 comprises a second central position 641 and a second branch 643, connecting perpendicularly with the second central portion 641. The second branch 643 of the second pixel electrode 64 overlaps with at least a part of the second common electrode 66. The width of the second branch 643 of the second pixel electrode 64 extends about 0 to 4 μm out of one side of the second common electrode 66.

In the invention, the first pixel electrode 63 and the second pixel electrode 64 of the pixel structure 6 are independent of each other. Consequently, the voltage levels of both pixel electrodes may differ in that the liquid crystal layers 69 are distributed according to the different electric field strengths of the pixel electrodes. Furthermore, each of the pixel electrodes has four sub-domains, and hence, a pixel structure 6 comprises eight liquid crystal sub-domains. Because the branches of the pixel electrodes overlap with the common electrode, and thus, shield the pixel structure 6, light leakage of the pixel structure 6 is prevented.

The third embodiment is only used to illustrate one aspect of the invention. Adjustments can be made in other embodiments. For example, either the width of the first branch can be equal to the width of the first common electrode, or the width of the second branch can be equal to the width of the second common electrode. The difference in width between the first branch of the first pixel electrode and the first common electrode is about 0 μm to 8 μm.

The invention further reveals an array panel used in a TFT LCD. The array panel comprises a substrate, a first common electrode, a second common electrode, and a plurality of pixel structures. Both the first common electrode and the second common electrode are disposed on the substrate, and the plurality of the pixel structures is also disposed on the substrate.

Figure 8:
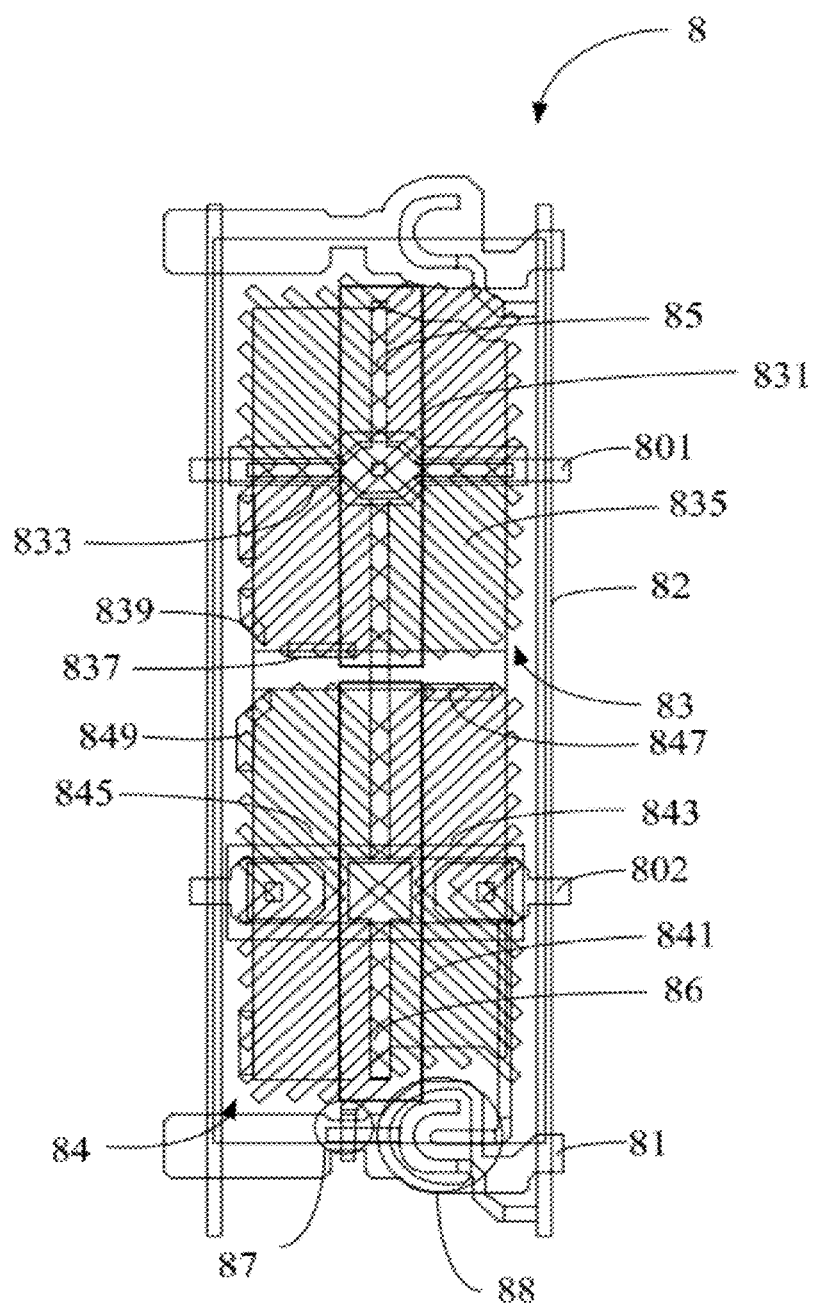
FIG. 8 is an upper view of the pixel structure of a fourth embodiment of the invention.

A fourth embodiment of the invention is shown in FIG. 8 which shows an upper view of a pixel structure 8. In this embodiment, the pixel structure 8 comprises a scan line 81, a data line 82, a first pixel electrode 83, a second pixel electrode 84, a first shield, a second shield, a first switch, and a second switch. The scan line 81 is used to transmit a scan signal, while the data line 82 is used to transmit a voltage signal. The first shield is a first conducting wire 85, connected electrically to the first pixel electrode 83. The second shield is a second conducting wire 86. The arrangement of the first conducting wire 85 and the second conducting wire 86 is similar to that of the first embodiment and thus, is omitted here. The first switch and the second switch are the first TFT 87 and second TFT 88, respectively.

The first pixel electrode 83 comprises a first central position 831, a first branch 833, a plurality of first sub-branches 835, a first connecting portion 837, and a first auxiliary connecting portion 839. The number of the first connecting portion 837 can be plural, while the first connecting portion 837 and the first auxiliary connecting portion 839 may or may not connect together. The first branch 833 connects perpendicularly with the first central portion 831 and overlaps with at least part of the first common electrode 801. The width of the first branch 833 of the first pixel electrode 83 is about 0 to 8 μm wider than that of the first common electrode 801.

The plurality of first sub-branches 835 connects with the first central portion 831. Preferably, the plurality of first sub-branches 835 extends along the direction of an included angle, which can range from either 40°~50°, 130°~140°, 220°~230°, or 310°~320°, with the first central portion 831. More preferably, the plurality of first sub-branches 835 extends along the directions of these four included angles, 45°, 135°, 225°, and 315°. The portion of the plurality of first sub-branches 835 forms the same included angle with the first central portion 831 and the portion of the plurality of the first sub-branches 835 is parallel. Consequently, the first pixel electrode 83 can be divided into four sub-domains according to the branch directions. The first conducting wire 85, used as a shield, overlaps with the first central portion 831 and part of the plurality of first sub-branches 835. As shown in FIG. 8, the first conducting wire 85 can be a cross, overlapping with the first central portion 831 and a part of the plurality of first sub-branches 835.

The first connecting portion 837 connects the ends of at least two adjacent branches of the plurality of first sub-branches 835, wherein the first connecting portion 837 is substantially perpendicular with the first central portion 831 of the first pixel electrode 83. The first auxiliary connecting portion 839 connects the ends of at least two adjacent branches of the first pixel electrode 83, wherein the first auxiliary connecting portion 839 and the first central portion 831 is substantially not perpendicular. In this embodiment, the first auxiliary connecting portion 839 is a polygon. One end of the polygon is substantially parallel to the first central portion 831, while the extension line of the other end substantially forms an acute angle with the first central portion 831.

The second pixel electrode 84 comprises a second central position 841, a second branch 843, a plurality of second sub-branches 845, a second connecting portion 847, and a second auxiliary connecting portion 849. The second branch 843 connects perpendicularly with the second central portion 841 and overlaps with at least part of a second common electrode 802. The width of the second branch 843 of the second pixel electrode 84 is about 0 to 4 μm wider than that of the second common electrode 802.

The plurality of second sub-branches 845 connects with the second central portion 841. Preferably, the plurality of second sub-branches 845 extends along the direction of an included angle, which can range from either 40°~50°, 130°~140°, 220°~230°, or 310°~320° with the second central portion 841. More preferably, the plurality of second sub-branches 845 extends along the direction of these four included angles of, 45°, 135°, 225°, and 315°. The portion of the plurality of second sub-branches 845 forms the same included angle with the second central portion 841 and the portion of the plurality of second sub-branches 845 is parallel. Consequently, the second pixel electrode 84 can be divided into four sub-domains according to branch directions. The second conducting wire 86, used as a shield, overlaps with the second central portion 841 and part of the plurality of second sub-branches 845. In this embodiment, the first conducting wire 85 or the second conducting wire 86 can be made of a metal material.

The second connecting portion 847 connects the ends of at least two adjacent branches of the plurality of second sub-branches 845, wherein the second connecting portion 847 is substantially perpendicular to the second central portion 841 of the second pixel electrode 84. The second auxiliary connecting portion 849 connects the ends of at least two adjacent branches of the second pixel electrode 84, wherein the second auxiliary connecting portion 849 and the second central portion 841 is substantially not perpendicular. In this embodiment, the second auxiliary connecting portion 849 is a polygon. One end of the polygon is substantially parallel to the second central portion 841, while the extension line of the other end substantially forms an acute angle with the second central portion 841.

The first TFT 87 electrically connects to the first pixel electrode 83, while the second TFT 88 electrically connects to the second pixel electrode 84. The first TFT 87 and the second TFT 88 are electrically coupled in the same manner as the first embodiment and thus, is omitted here.

The first pixel electrode 83 and the second pixel electrode 84 of the pixel structure 8 are independent of each other. Consequently, the voltage levels of both pixel electrodes may differ in that the liquid crystal layer is distributed according to the different electric field strengths of the pixel electrodes. Furthermore, each of the pixel electrodes has four sub-domains and hence, a pixel structure 8 comprises eight liquid crystal sub-domains.

In this invention, a shield extends to the central portion of each pixel electrode for shielding the central portion. The shielding manner of the branches of the pixel electrodes that results from the overlap with the common electrode prevents light leakage of the pixel structure thereby improving the shape of the brightness area. Furthermore, with the voltage level adjustment of the connecting portion and the auxiliary connecting portion in the invention, the regular arrangement of the liquid crystal cells between the two pixel electrodes avoids insufficient color saturation and color washout under wide viewing angles.

The fourth embodiment is only used to illustrate one aspect of the invention. Other adjustments may be made to the invention. For example, the structures of the two pixel electrodes may be different. For example, the structures of the pixel electrode mentioned in the aforementioned four embodiments may be adopted. Furthermore, each pixel structure may use different a pixel structure in the mentioned four embodiments.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An array panel, comprising:
   a substrate;
   a first common electrode disposed on the substrate;
   a plurality of pixel structures disposed on the substrate, wherein each of the pixel structures comprises:
   a scan line;
   a data line;
   a first switch electrically connected with the scan line and the data line;
   a first pixel electrode comprising a central portion and a first branch connecting with the central portion, wherein the central portion is substantially parallel with the data line, and
   a first shield at least overlapping the central portion of the first pixel electrode;
   wherein the first branch of the first pixel electrode overlaps at least part of the first common electrode, a width of the first branch of the first pixel electrode is wider than or equal to that of the first common electrode, and a portion of the first common electrode is substantially shielded by the central portion of the first pixel electrode;
   wherein the first shield comprises a conducting wire electrically connecting with the first pixel electrode.

2. An array panel, comprising:
   a substrate;
   a first common electrode disposed on the substrate;
   a plurality of pixel structures disposed on the substrate, wherein each of the pixel structures comprises:
   a scan line;
   a data line;
   a first switch electrically connected with the scan line and the data line;
   a first pixel electrode comprising a central portion and a first branch connecting with the central portion, wherein the central portion is substantially parallel with the data line, and
   a first shield at least overlapping the central portion of the first pixel electrode;
   wherein the first branch of the first pixel electrode overlaps at least part of the first common electrode, a width of the first branch of the first pixel electrode is wider than or equal to that of the first common electrode, and a portion of the first common electrode is substantially shielded by the central portion of the first pixel electrode;
   wherein the first pixel electrode further comprises a plurality of first sub-branches and a first connecting portion configured to connect ends of at least two adjacent first sub-branches of the first pixel electrode, and the first connecting portion is substantially perpendicular to the central portion of the first pixel electrode.

3. The array panel as claimed in claim 2, wherein the first pixel electrode further comprises a first auxiliary connecting portion for connecting ends of at least two adjacent first sub-branches of the first pixel electrode, and the first auxiliary connecting portion is substantially not perpendicular to the central portion of the first pixel electrode.

4. An array panel, comprising:
   a substrate;
   a first common electrode disposed on the substrate;
   a second common electrode disposed on the substrate,
   a plurality of pixel structures disposed on the substrate, wherein each of the pixel structures comprises:
   a scan line;
   a data line;
   a first switch electrically connected with the scan line and the data line; and
   a first pixel electrode comprising a central portion and a first branch connecting with the central portion, wherein the central portion is substantially parallel with the data line, wherein the first branch of the first pixel electrode overlaps at least part of the first common electrode, a width of the first branch of the first pixel electrode is wider than or equal to that of the first common electrode, and a portion of the first common electrode is substantially shielded by the central portion of the first pixel electrode;
   a second pixel electrode having a central portion and a second branch perpendicularly connecting with the central portion, wherein the second branch of the second pixel electrode overlaps at least part of the second common electrode, and a width of the second branch of the second pixel electrode is wider than or equal to that of the second common electrode.

5. The array panel as claimed in claim 4, wherein the second pixel electrode further has a plurality of second sub-branches and a second connecting portion configured to connect ends of at least two adjacent second sub-branches of the second pixel electrode, and the second connecting portion is substantially perpendicular to the central portion of the second pixel electrode.

6. The array panel as claimed in claim 4, wherein each of the pixel structures further comprises a second shield at least overlapping the central portion of the second pixel electrode.

7. The array panel as claimed in claim 6, wherein the second pixel electrode further comprises a plurality of second sub-branches and a second connecting portion configured to connect ends of at least two adjacent second sub-branches of the second pixel electrode, and the second connecting portion is substantially perpendicular to the central portion of the second pixel electrode.

\* \* \* \* \*